(12) United States Patent
Nedorezov et al.

(10) Patent No.: US 8,464,529 B2
(45) Date of Patent: Jun. 18, 2013

(54) REDUCTION IN TURBOCHARGER LAG AT HIGH ALTITUDES

(75) Inventors: Felix Nedorezov, Rochester Hills, MI (US); Ken Jahr, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 208 days.

(21) Appl. No.: 13/039,144

(22) Filed: Mar. 2, 2011

(65) Prior Publication Data
US 2011/0203272 A1 Aug. 25, 2011

(51) Int. Cl.
F02B 33/44 (2006.01)
F02D 23/00 (2006.01)
F02P 5/15 (2006.01)
F02P 5/00 (2006.01)
G06F 7/00 (2006.01)

(52) U.S. Cl.
USPC ............. 60/611; 123/339.11; 123/406.11; 123/406.12; 123/406.13; 60/600; 701/105

(58) Field of Classification Search
USPC ............ 701/103, 104, 105, 113; 123/406.11, 123/406.12, 406.35, 404.41, 339.1, 339.11, 123/380, 399, 433, 65 BA, 65 VC, 406.53, 123/406.69, 406.22; 60/611, 600
See application file for complete search history.

(56) References Cited

U.S. PATENT DOCUMENTS

| | | | | |
|---|---|---|---|---|
| 2,538,377 A * | 1/1951 | Ostling | ............... | 123/406.69 |
| 3,203,411 A * | 8/1965 | Seiden | ............... | 123/406.11 |
| 4,378,770 A * | 4/1983 | Ikeura | ............... | 123/406.53 |
| 4,379,333 A * | 4/1983 | Ninomiya et al. | ............ | 701/105 |
| 4,805,574 A * | 2/1989 | Sakamoto et al. | ......... | 123/406.55 |
| 5,083,533 A * | 1/1992 | Richeson et al. | .......... | 123/65 VC |
| 5,131,354 A * | 7/1992 | Richeson | ................ | 123/76 |
| 5,189,996 A * | 3/1993 | Richeson et al. | .......... | 123/65 BA |
| 5,197,434 A * | 3/1993 | Contreras Orellana | ....... | 123/433 |
| 5,778,857 A * | 7/1998 | Nakamura et al. | ......... | 123/406.41 |
| 6,182,636 B1 * | 2/2001 | Russell et al. | ................ | 123/399 |
| 6,286,480 B1 * | 9/2001 | Chen et al. | .................... | 123/380 |
| 6,488,005 B2 | 12/2002 | Kim | ........................ | 123/339.16 |
| 6,513,489 B2 * | 2/2003 | Osanai | ..................... | 123/339.11 |
| 6,684,630 B2 | 2/2004 | Uchida et al. | .................. | 60/284 |
| 6,796,289 B2 | 9/2004 | Uraki et al. | ................. | 123/406.5 |
| 7,210,290 B1 | 5/2007 | Najmon | ........................ | 60/362 |
| 7,505,845 B2 * | 3/2009 | Yasuda et al. | ................. | 701/103 |
| 7,779,796 B2 | 8/2010 | Nakamura | ................ | 123/90.15 |
| 2002/0095932 A1 * | 7/2002 | Izumiura et al. | ................ | 60/285 |
| 2005/0145217 A1 * | 7/2005 | Takama et al. | ............. | 123/339.11 |
| 2008/0154485 A1 * | 6/2008 | Yasuda et al. | ................. | 701/113 |
| 2010/0155157 A1 | 6/2010 | Grieve | .......................... | 123/565 |
| 2011/0225967 A1 * | 9/2011 | Karnik et al. | .................. | 60/602 |

(Continued)

*Primary Examiner* — Thai Ba Trieu
(74) *Attorney, Agent, or Firm* — Julia Voutyras; Alleman Hall McCoy Russell & Tuttle LLP

(57) ABSTRACT

A method of operating a turbocharged engine having cylinders in which one of the cylinders undergoes a compression stroke. The method includes advancing an ignition spark in the one of the cylinders undergoing the compression stroke by a first amount relative to top dead center of the compression stroke at a first barometric pressure for a given engine speed and load, and advancing the ignition spark in the one of the cylinders undergoing the compression stroke by a second, lesser amount relative to top dead center of the compression stroke at a second, lower barometric pressure, for the given engine speed and load as the vehicle being at different altitudes.

20 Claims, 7 Drawing Sheets

U.S. PATENT DOCUMENTS

2011/0231081 A1* 9/2011 Suzuki et al. .................. 701/104
2011/0314807 A1* 12/2011 Karnik et al. ................... 60/602
2012/0221224 A1* 8/2012 Worthing et al. .............. 701/102
2012/0260886 A1* 10/2012 Mulye ......................... 123/25 C

* cited by examiner ial # US 8,464,529 B2

REDUCTION IN TURBOCHARGER LAG AT HIGH ALTITUDES

TECHNICAL FIELD

This application relates to the field of motor-vehicle engineering, and more particularly, to turbocharger lag reduction in motor vehicle engine systems.

BACKGROUND AND SUMMARY

In a turbocharged engine system, intake air is compressed using torque derived from expanding engine exhaust. The compressed—i.e., boosted—intake air increases the power output of the engine relative to that of a naturally aspirated engine of the same displacement. Accordingly, addition of a turbocharger may allow a vehicle to be driven by a 'downsized' engine, for better fuel economy, while still maintaining acceptable power for vehicle launch.

However, a conventional turbocharger may exhibit an acceleration lag when the exhaust-driven turbine is spinning too slowly to provide enough torque to the intake-air compressor. When tip-in is initiated from this state, exhaust temperature and pressure may build slowly, because the engine— possibly a downsized engine—is operating with little or no boost. This problem may become more noticeable at higher altitudes, where the barometric pressure and oxygen content of the ambient air is reduced. It may be especially noticeable in automatic-transmission vehicles, where drive shaft and axle are coupled through a torque converter. A conventional torque converter may exhibit a so-called stall speed for the drive shaft, below which the torque converter will not develop sufficient torque to move the vehicle. As a result, the net acceleration lag may be exacerbated such that it takes several seconds to accelerate the vehicle, even on a level surface. Naturally, if the vehicle is oriented uphill, the lag may be greater still, resulting in driver dissatisfaction.

Various approaches have been advanced to address the issue of turbocharger lag. For example, U.S. Patent Application Publication Number 2010/0155157 describes a turbocharger operable as an electrically driven supercharger under conditions of inadequate exhaust energy. Solutions like this, which require extensive additional hardware, may be costly to implement. Other approaches address limited aspects of turbocharger lag via control-system modifications. For example, U.S. Pat. No. 6,488,005 describes a diesel engine in which idle speed is increased if the vehicle is oriented uphill, thereby providing a greater reserve of compressor torque. However, this approach, among others, fails to contemplate the range of remedies that may be taken to reduce turbocharger lag, as well as the range of observables useful for predicting when such remedies may be applied.

Therefore, one embodiment provides a method of operating a turbocharged engine of a motor vehicle, the engine having a cylinder which undergoes a compression stroke. The method includes, for a given engine speed and load, advancing an ignition spark in the cylinder by a first amount relative to top dead center (TDC) of the compression stroke at a first barometric pressure. The method also includes advancing the ignition spark by a second, lesser amount relative to TDC of the compression stroke at a second, lower barometric pressure, for the same engine speed and load. Operating according to this method, a suitably configured engine will release higher-temperature exhaust at the lower barometric pressure, providing more energy to spin up the turbine, for faster accumulation of boost.

The summary above is provided to introduce a selected part of this disclosure in simplified form, not to identify key or essential features. The claimed subject matter, defined by the claims, is limited neither to the content of this summary nor to implementations that address problems or disadvantages noted herein.

DETAILED DESCRIPTION

Figure 1:
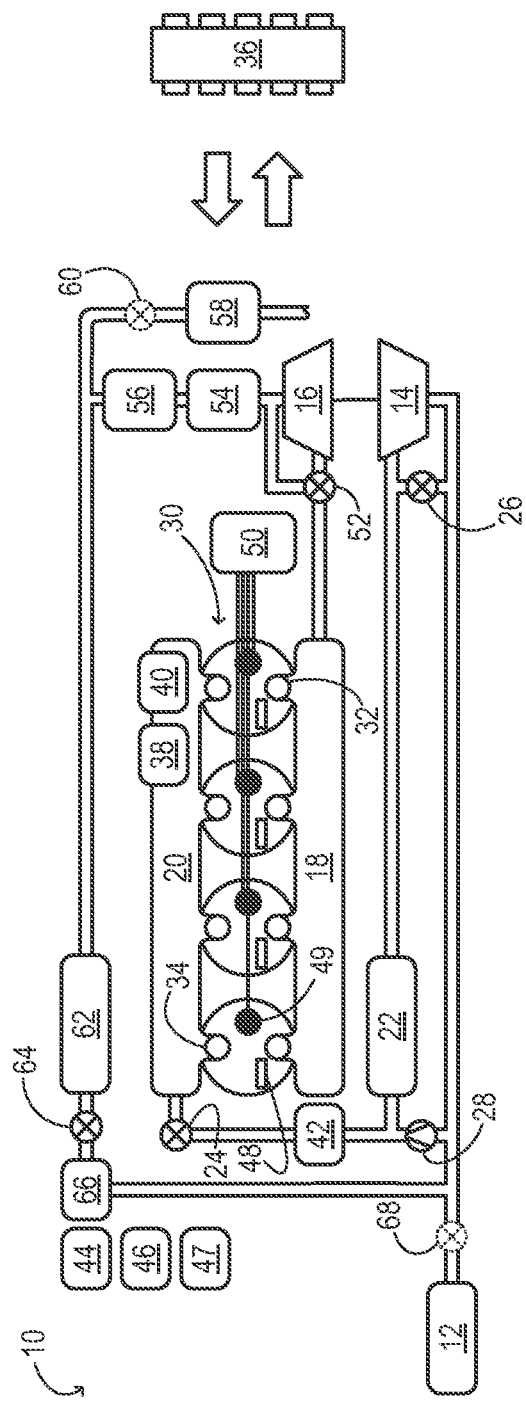
FIG. 1 schematically shows aspects of an example engine system in accordance with an embodiment of this disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 schematically shows aspects of an example engine system 10 in one embodiment. In engine system 10, fresh air is inducted into air cleaner 12 and flows to compressor 14. The compressor may be any suitable intake-air compressor—a motor-driven or driveshaft driven supercharger compressor, for example. In engine system 10, however, the compressor is a turbocharger compressor mechanically coupled to turbine 16, the turbine driven by expanding engine exhaust from exhaust manifold 18. In one embodiment, the compressor and turbine may be coupled within a twin scroll turbocharger. In another embodiment, the turbocharger may be a variable geometry turbocharger (VGT), in which turbine geometry is actively varied as a function of engine speed.

In engine system 10, compressor 14 is coupled fluidically to intake manifold 20 via charge-air cooler 22 and throttle 24. Accordingly, pressurized air from the compressor flows through the charge-air cooler and the throttle en route to the intake manifold. The charge-air cooler may be any suitable heat exchanger configured to cool the intake air charge for desired combustion and emissions-control performance. As shown in FIG. 1, compressor by-pass valve 26 is coupled between the inlet and the outlet of the compressor. The compressor by-pass valve may be a normally closed valve configured to open at the command of an electronic control system (vide infra) in order to relieve excess boost pressure under selected operating conditions. For example, the compressor by-pass valve may be opened during conditions of decreasing engine speed to avert compressor surge. When the compressor by-pass valve is opened, uncompressed ambient air may flow to throttle 24 through check valve 28. Check valve 28 enables fresh air bypass of most of the EGR-diluted air charge upstream of the throttle. This feature may reduce the impact of residual EGR-diluted air in the engine system during tip-out.

In engine system 10, exhaust manifold 18 and intake manifold 20 are coupled to a series of cylinders 30 through a series of exhaust valves 32 and intake valves 34, respectively. Each cylinder cycles through the usual sequence of intake, compression, power, and exhaust strokes. In one embodiment, each of the exhaust and intake valves may be electronically actuated. In another embodiment, each of the exhaust and intake valves may be cam actuated. Whether electronically actuated or cam actuated, the timing of exhaust and intake valve opening and closure may be adjusted as needed for desired combustion stability, turbocharger performance, and emissions control.

The valve timing may be adjusted so that combustion is initiated when a controlled amount of exhaust from a previous combustion is still present in one or more cylinders. Such exhaust gas may be retained in a cylinder—e.g., not expelled or not fully expelled from the cylinder during the exhaust stroke. Exhaust may also be readmitted to the cylinder from the exhaust manifold during the intake stroke, via a still open exhaust valve. For example, as the closure timing of the exhaust valve is moved away from TDC of the exhaust stroke, increased amounts of exhaust gas may be retained, depending on parameters such as engine speed, engine load, etc. Early exhaust valve closure (before TDC of the exhaust stroke) may be used to limit the expulsion of exhaust gasses and increase residual exhaust retained for the next combustion event in a particular cylinder. In another example, late exhaust-valve closure (e.g., closure of the exhaust valve during the intake stroke of a subsequent cylinder cycle) may increase exhaust gases drawn in from the exhaust manifold to the cylinder during the intake stroke, again increasing intake-air dilution. Accordingly, adjusted valve timing may enable an 'internal EGR' mode useful for diluting the intake air charge under selected operating conditions. In some embodiments, it may be used in addition to one or more 'external EGR' modes to be described hereinafter. In yet another example, early exhaust-valve opening (e.g., opening of the exhaust valve during the power stroke) may be applied to increase the temperature of the exhaust and thereby hasten the warm-up of exhaust-aftertreatment catalysts (vide infra), or of turbine 16, or to provide increased energy to drive the turbine.

FIG. 1 shows electronic control system 36, which may be any electronic control system of the vehicle in which engine system 10 is installed. In embodiments where at least one intake or exhaust valve is configured to open and close according to an adjustable timing, the adjustable timing may be controlled via the electronic control system. To assess operating conditions in connection with the control functions of the engine system, the electronic control system may be operatively coupled to a plurality of sensors arranged throughout the engine system—flow sensors, temperature sensors, accelerator pedal-position sensors, pressure sensors, etc. In FIG. 1, for example, manifold air-pressure (MAP) sensor 38 and manifold air-temperature sensor (MAT) 40 are shown coupled to intake manifold 20; mass air-flow (MAF) sensor 42 is coupled upstream of throttle 24. Barometric-pressure sensor 44, accelerator-pedal position sensor 46, and vehicle speed sensor 47 may also be coupled to the electronic control system. Various other sensors may be provided as well, in this and other embodiments.

Cylinders 30 may be supplied one or more of a variety of fuels: gasoline, alcohols, diesel, biodiesel, compressed natural gas, etc. Fuel may be supplied to the cylinders via direct injection, port injection, throttle-body injection, or any combination thereof. In the illustrated embodiment, a fuel injector 48 is coupled to each of the cylinders and configured to supply the desired amount of fuel thereto, in response to a control signal from electronic control system 36. With concurrent control of fuel injectors 48 and throttle 24, the electronic control system may regulate the air-to-fuel ratio $\lambda$ of the intake charge received in each of the cylinders. In some control strategies, the air-to-fuel ratio received in different cylinders may be different. In some embodiments, the normal air-to-fuel ratio of the intake charge may be stoichiometric or somewhat lean ($1.0<\lambda<1.2$). Under certain conditions, however, the air-to-fuel ratio for at least one of the cylinders may be transiently enriched so that a hotter exhaust is emitted from the cylinder. Such hotter exhaust may provide faster spin-up of turbine 16 during tip-in conditions.

In engine system 10, combustion is initiated via spark ignition. Accordingly, the engine system includes a series of spark plugs 49 configured to receive timed voltage pulses from electronic ignition system 50. The electronic ignition system may be configured to apply an ignition spark to each cylinder at TDC of the combustion stroke in that cylinder, or to advance the ignition spark by a selectable and variable amount. The amount of spark advance may be selected by electronic control system 36 in order to effect the desired combustion stability, turbocharger performance, and/or emissions control. In particular, although the ignition spark may be advanced relative to TDC of the combustion stroke, the amount of the advance may be limited (i.e., selectively reduced) as needed to effect a delay in the combustion occurring within a cylinder, so that a hotter exhaust is emitted from the cylinder. Such hotter exhaust may provide faster warm-up of exhaust-aftertreatment devices or of turbine 16, under conditions where these components have dropped below desired operating temperatures. Hotter exhaust may also provide faster spin-up of turbine 16 during tip-in conditions.

As noted above, exhaust from exhaust manifold 18 flows to turbine 16 to drive the turbine. When reduced turbine torque is desired, some exhaust may be directed instead through waste gate 52, by-passing the turbine. The combined flow from the turbine and the waste gate then flows through exhaust-aftertreatment devices 54 and 56. The nature, number, and arrangement of the exhaust-aftertreatment devices may differ in the different embodiments of this disclosure. In general, the exhaust-aftertreatment devices may include at least one exhaust-aftertreatment catalyst configured to catalytically treat the exhaust flow, and thereby reduce an amount of one or more substances in the exhaust flow. For example, one exhaust-aftertreatment catalyst may be configured to trap $NO_x$ from the exhaust flow when the exhaust flow is lean, and to reduce the trapped $NO_x$ when the exhaust flow is rich. In other examples, an exhaust-aftertreatment catalyst may be configured to disproportionate $NO_x$ or to selectively reduce $NO_x$ with the aid of a reducing agent. In still other examples, an exhaust-aftertreatment catalyst may be configured to oxidize residual hydrocarbons and/or carbon monoxide in the exhaust flow. Different exhaust-aftertreatment catalysts having any such functionality may be arranged in wash coats or elsewhere in the exhaust-aftertreatment devices, either separately or together. In some embodiments, the exhaust-aftertreatment devices may include a regenerable soot filter configured to trap and oxidize soot particles in the exhaust flow.

Continuing in FIG. 1, all or part of the treated exhaust from the exhaust aftertreatment devices may be released into the ambient via silencer 58. In engine system 10, the treated exhaust flows to the silencer via exhaust back-pressure valve 60. Depending on operating conditions, some treated exhaust may be diverted through EGR cooler 62. The exhaust may be diverted by opening an EGR valve 64 coupled in series with the EGR cooler. The EGR cooler may be any suitable heat exchanger configured to cool the exhaust flow to temperatures suitable for mixing into the intake air charge. In this manner, some exhaust may be delivered to the intake manifold via a cooled conduit coupled downstream of the turbine and upstream of the compressor. From EGR cooler 62, the cooled exhaust gas flows to EGR valve 64; from the EGR valve, it flows through EGR flow sensor 66 en route to compressor 14.

In some embodiments, throttle 24, compressor by-pass valve 26, waste gate 52, exhaust back-pressure valve 60, and/or EGR valve 64 may be electronically controlled valves configured to close and open at the command of electronic control system 36. Further, one or more of these valves may be continuously adjustable. The electronic control system may be operatively coupled to each of the electronically controlled valves and configured to command their opening, closure, and/or adjustment as needed to enact any of the control functions described herein. For example, the electronic control system may command the throttle to open more with increasing engine load and/or driver demand (e.g., accelerator-pedal depression). In addition, the electronic control system may set the idle speed of the engine by controlling the throttle opening amount commanded when the accelerator pedal is not depressed. Other embodiments may include a separate, low-flow idle throttle, distinct from throttle 24, also controlled by the electronic control system. In either case, the electronic control system may open the appropriate throttle to a suitable amount at level to effect the desired idle speed.

To monitor the external EGR flow and enable additional control based on the external EGR flow, engine system 10 includes EGR flow sensor 66. The EGR flow sensor may be operatively coupled to the electronic control system and configured to provide an output responsive to the external EGR flow. Exhaust-back pressure valve 60 may be partially closed to maintain adequate flow potential in the external EGR loop. When the exhaust back-pressure valve is partially closed, exhaust pressure builds at the LP EGR take-off point, thereby increasing the external EGR flow potential. Partially closing the exhaust back-pressure valve may also increase the internal EGR rate by increasing the exhaust pressure in exhaust manifold 18. In another embodiment, the engine system may lack exhaust backpressure valve 60, but include clean-air throttle 68 coupled downstream of air cleaner 12. The clean-air throttle may be an electronically controlled valve operatively coupled to electronic control system 36. The clean-air throttle may be kept fully open under normal operating conditions, but partially closed at low engine loads to maintain adequate flow potential in the external EGR loop. When the clean-air throttle is partially closed, a partial vacuum develops downstream of the clean-air throttle, thereby increasing the external EGR flow potential. In other embodiments fully consistent with this disclosure, the engine system may include both an exhaust back-pressure valve and a clean-air throttle. In still other embodiments, the engine system may include neither.

The configurations described above enable various methods for operating a turbocharged engine of a motor vehicle. Accordingly, some such methods are now described, by way of example, with continued reference to the above configurations. It will be understood, however, that the methods here described, and others fully within the scope of this disclosure, may be enabled by other configurations as well. Naturally, each execution of a method may change the entry conditions for a subsequent execution and thereby invoke a complex decision-making logic. Such logic is fully contemplated in this disclosure. Further, some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

The methods presented herein include various measuring and/or sensing events enacted via one or more sensors disposed in the engine system. The methods also include various computation, comparison, and decision-making events, which may be enacted in electronic control system 36, operatively coupled to the sensors. The methods further include various hardware-actuating events, which the electronic control system may command selectively, pursuant to the decision-making events. These methods may entail one or more different processing strategies, such as event-driven, interrupt-driven, multi-tasking, multi-threading, and the like. As such, the disclosed process steps (operations, functions, and/or acts) may correspond to code to be programmed into computer readable storage medium in the electronic control system.

Figure 2:
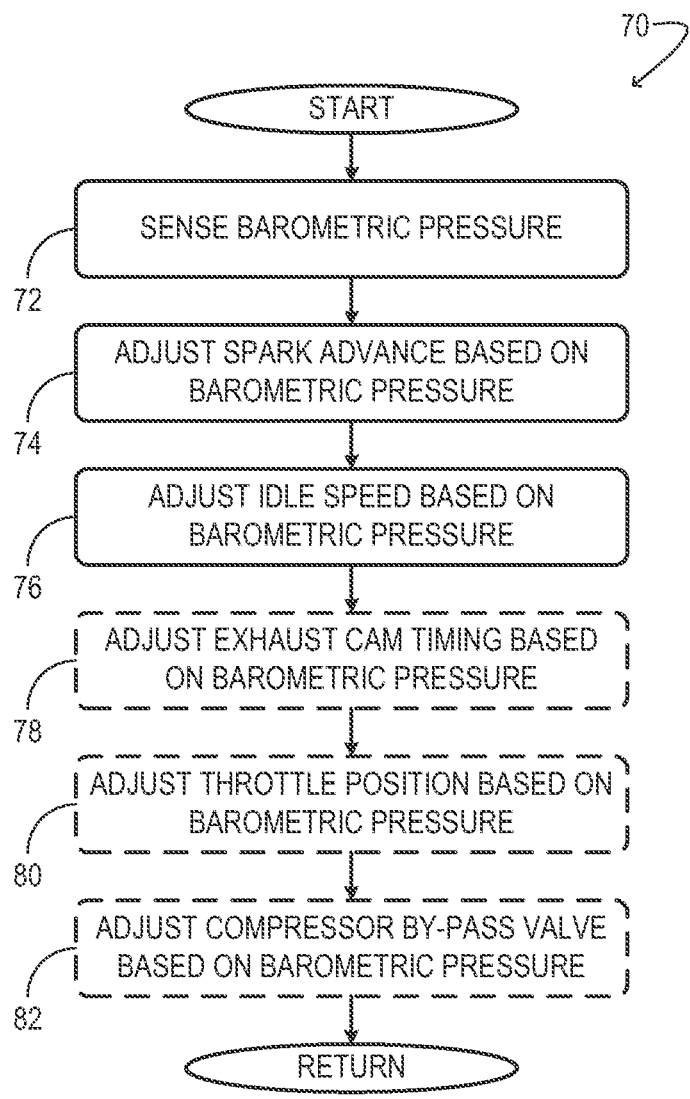
FIG. 2 illustrates an example method for operating a turbocharged engine in accordance with an embodiment of this disclosure.

FIG. 2 shows an example method 70 for operating a turbocharged engine of a motor vehicle. At 72 the barometric pressure of the ambient air is sensed. The barometric pressure may be sensed, for example, by interrogating barometric pressure sensor 44 or any sensor of the motor vehicle responsive to barometric pressure. At 74 the amount of spark advance is adjusted based on the barometric pressure. The appropriate amount of spark advance for standard atmospheric pressure (e.g., 760 Torr) may be derived from a matrix stored in the memory of electronic control system 36. The matrix may comprise a plurality of rows corresponding to different engine speeds and a plurality of columns corresponding to different engine loads. At the intersection of each row and column, the appropriate amount of spark advance for the corresponding engine speed and load may be entered. The spark advance may be entered for standard conditions in units of degrees relative to TDC of the compression stroke, for example. In one embodiment, the spark advance may be decreased monotonically—e.g., relative to the standard value from the matrix—with decreasing barometric pressure. In this and other embodiments, electronic control system 36 may be configured to advance the ignition spark in a cylinder by a first amount relative to TDC of the compression stroke at a first barometric pressure, for a given engine speed and load. The electronic control system may be further configured to advance the ignition spark by a second, lesser amount relative to TDC of the compression stroke at a second, lower barometric pressure, for the given speed and load. Naturally, the given speed and load may be one of a plurality of operating points of the engine where the spark advance is defined for a standard barometric pressure, and adjusted at reduced barometric pressure, and in response to tip-in, as further described herein. In this manner, the engine may provide hotter exhaust to turbine 14 at lower barometric pressures. Such hotter exhaust may preheat turbine surfaces prior to tip-in, such that when tip-in is initiated, mechanical energy may be extracted from the exhaust more promptly, to lessen turbocharger lag.

At 76 the idle speed of the engine is adjusted based on the barometric pressure. In one embodiment, the idle speed may be increased monotonically with decreasing barometric pressure. Accordingly, the turbocharger may retain more inertia prior to tip-in, so that it can more quickly accelerate to the rotational rate required to provide boost. Moreover, the higher idle speed may keep the turbine surfaces hotter prior to tip-in, for the advantages noted above. In this and other embodiments, electronic control system 36 may be configured to idle the engine at a first idle speed at the first barometric pressure and at a second, higher idle speed at the second barometric pressure.

At 78 the exhaust cam timing is adjusted based on the barometric pressure. In one embodiment, the exhaust-valve opening timing may be increasingly advanced, monotonically, with decreasing barometric pressure. In this and other embodiments, electronic control system 36 may be configured to operate the engine at a first exhaust-valve opening timing at the first barometric pressure for the given engine load. The electronic control system may be further configured to operate the engine at a second, earlier exhaust-valve opening timing at the second barometric pressure, for the given engine load. In this manner, the engine may provide hotter exhaust to turbine 14 at lower barometric pressures. Such hotter exhaust may preheat turbine surfaces prior to tip-in, such that when tip-in is initiated, mechanical energy may be extracted from the exhaust more promptly, to lessen turbocharger lag.

At 80 the throttle position (e.g., deflection) as a function of engine load is adjusted based on the barometric pressure. In one embodiment, the throttle opening amount may be increased monotonically with decreasing barometric pressure. This action may make whatever turbocharger lag that remains less noticeable to the driver. In this and other embodiments, electronic control system 36 may be configured to operate the engine at a first throttle opening amount at the first barometric pressure for a given load. The electronic control system may be further configured to operate the engine at a second, larger throttle opening amount at the second barometric pressure, for the given engine load.

At 82 the compressor by-pass valve opening amount is adjusted as a function of engine load based on the barometric pressure. In one embodiment, the compressor by-pass valve opening amount may be increased monotonically with decreasing barometric pressure for the given engine load. In this way, the turbocharger will retain comparatively more inertia at low barometric pressures, even at low loads where little MAF is required. In this and other embodiments, electronic control system 36 may be configured to operate the engine with a compressor by-pass valve open to a first amount at the first barometric pressure, for the given engine load. The electronic control system may be further configured to operate the engine with the compressor by-pass valve open to a second, greater amount at the second barometric pressure, for the given engine load. From 82 the method returns.

Figure 3:
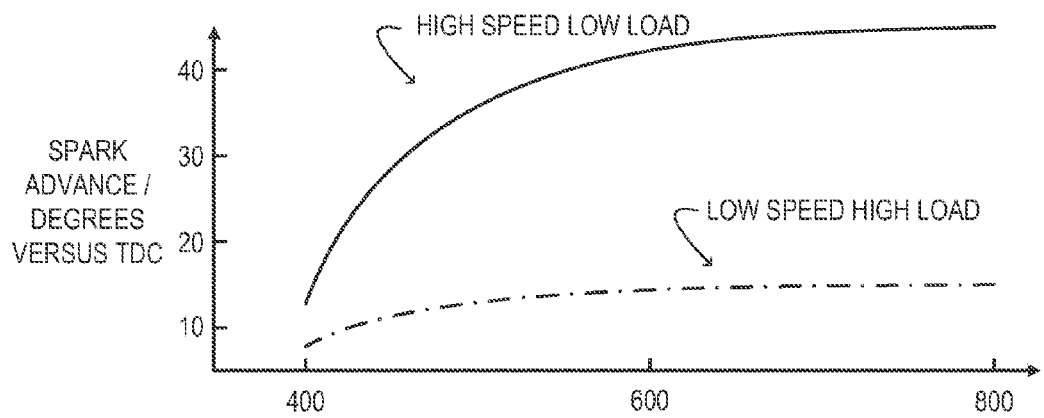
FIG. 3 is a graph of spark advance versus barometric pressure for example operating points of an engine system in accordance with an embodiment of this disclosure.
Figure 4:
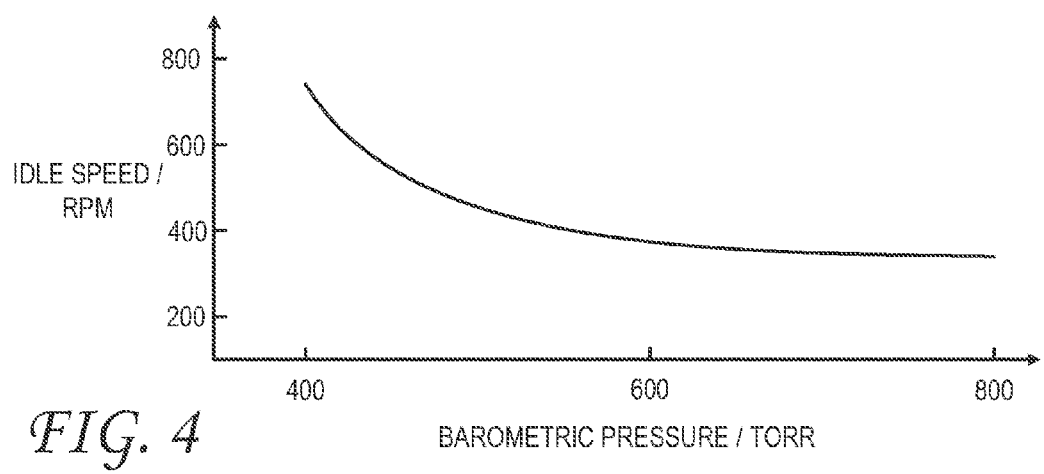
FIG. 4 is a graph of idle speed versus barometric pressure for an engine system in accordance with an embodiment of this disclosure.
Figure 5:
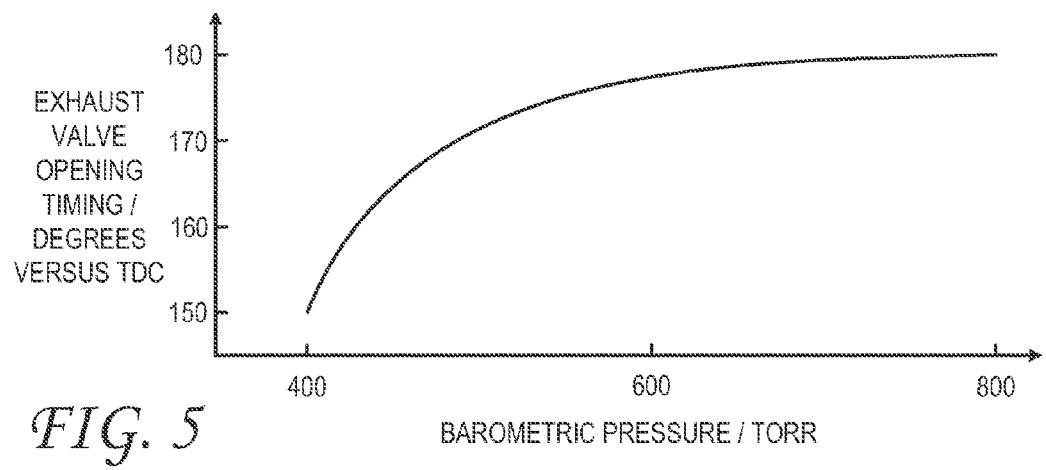
FIG. 5 is a graph of exhaust-valve opening timing versus barometric pressure for an engine system in accordance with an embodiment of this disclosure.

FIGS. 3 through 7 show additional aspects of the application of method 70 in one, non-limiting embodiment. FIG. 3 is a graph of spark advance versus barometric pressure for example high-speed, low-load operation (solid line), and for example low-speed, high-load operation (dot-dashed line). For both of the example operating points, and for numerous others on the load-speed map of the engine system, the spark advance decreases with decreasing barometric pressure. FIG. 4 is a graph of idle speed versus barometric pressure, showing that the idle speed increases with decreasing barometric pressure. FIG. 5 is a graph of exhaust-valve opening timing versus barometric pressure, showing that the exhaust-valve opening timing is advanced with decreasing barometric pressure.

Figure 6:
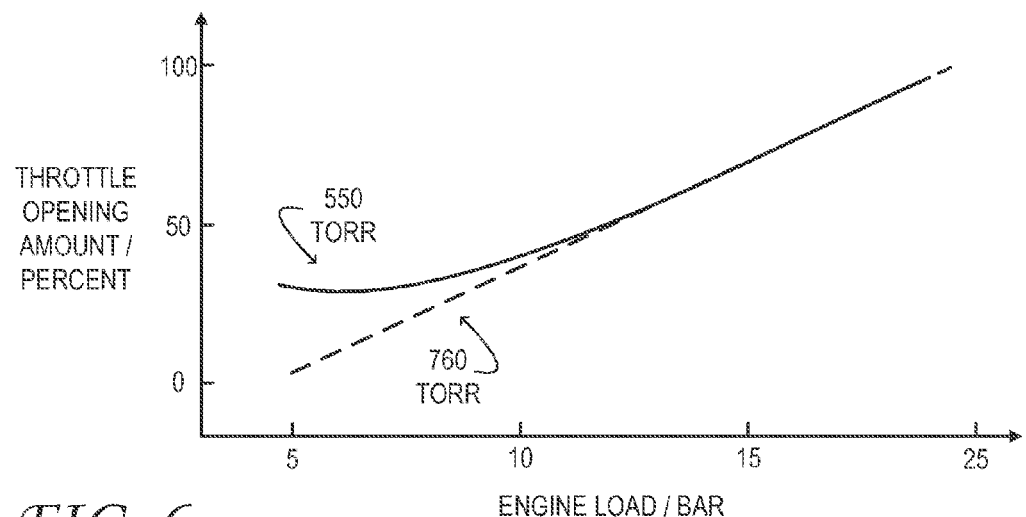
FIG. 6 is a graph of throttle-opening amount versus engine load for an engine system in accordance with an embodiment of this disclosure.

FIG. 6 is a graph of throttle-opening amount versus engine load. The dashed line is for a high barometric pressure of 760 Torr; it shows that the throttle-opening amount linearly tracks the engine load. The solid line is for an example low barometric pressure of 550 Torr. At the low barometric pressure, the throttle may be opened to a greater amount for the same value of the engine load.

Figure 7:
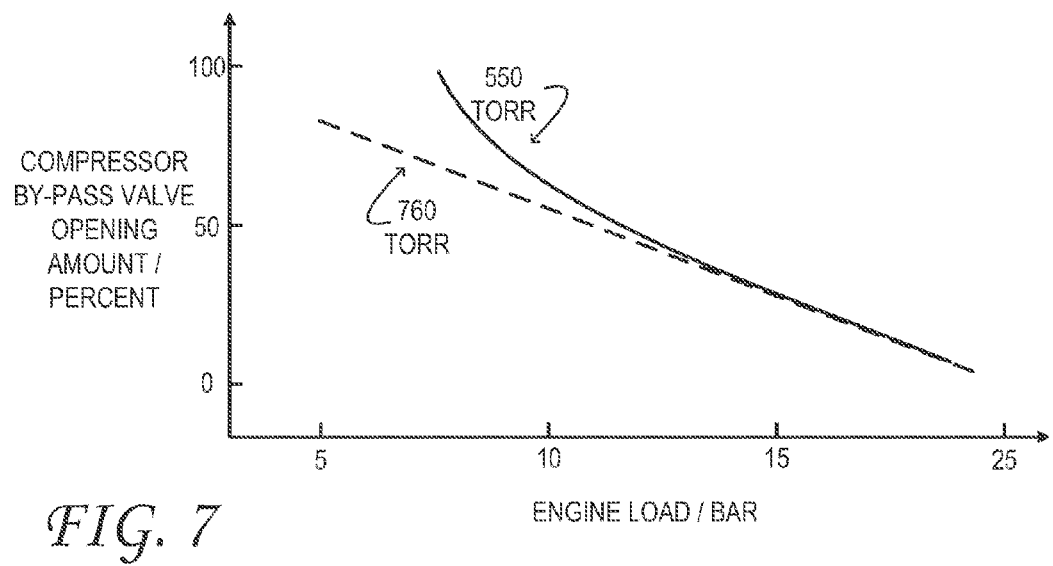
FIG. 7 is a graph of compressor by-pass valve opening amount versus engine load for an engine system in accordance with an embodiment of this disclosure.

FIG. 7 is a graph of compressor by-pass valve opening amount versus engine load. The dashed line is for a high barometric pressure of 760 Torr; it shows that the compressor-valve opening amount decreases linearly with increasing engine load. The solid line is for an example low barometric pressure of 550 Torr. At the low barometric pressure, the compressor by-pass valve may be opened to a greater amount for the same value of the engine load.

Figure 8:
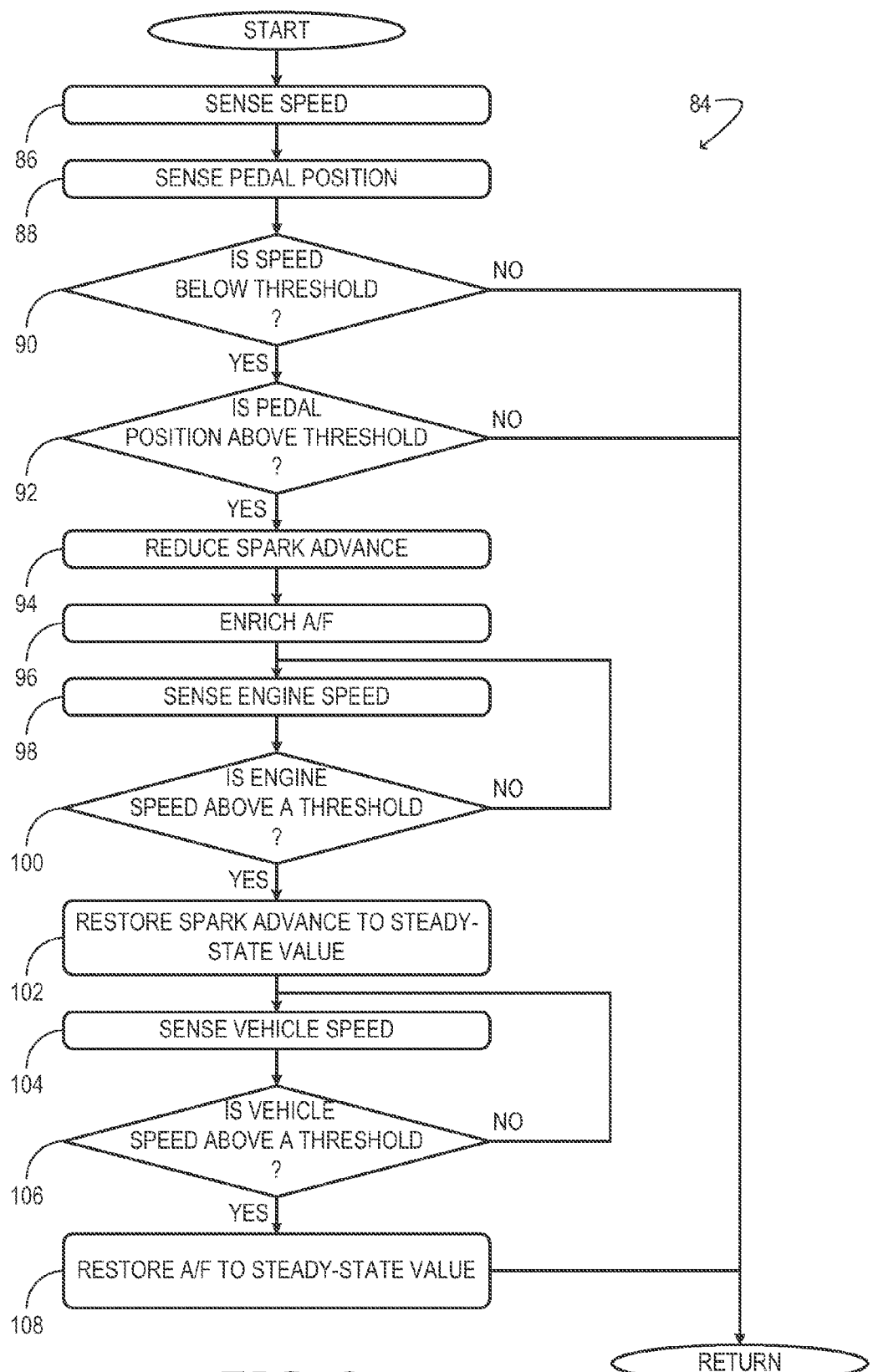
FIG. 8 illustrates an example method for responding to a tip-in condition of a turbocharged engine in accordance with an embodiment of this disclosure.

FIG. 8 illustrates an example method 84 for responding to a tip-in condition of a turbocharged engine. In one embodiment, methods 70 and 84 may be enacted concurrently. In one embodiment, method 84 may be enabled only when the sensed barometric pressure is below a threshold; in another embodiment, method 84 may be enabled irrespective of the barometric pressure. It will be understood that the term 'threshold', as used herein, may refer to a fixed threshold or to a threshold subject to design-time calibration and/or run-time refinement.

At 86 of method 84, a speed suitable for identifying a tip-in condition of the engine system is sensed. In one embodiment, the sensed speed may be the speed of the vehicle. Here, the speed may be sensed by vehicle speed sensor 47. In another embodiment, the sensed speed may be the speed of the engine of the vehicle. The engine speed may be sensed directly, via a tachometer or other sensor responsive to crankshaft or driveshaft velocity, or measured indirectly via surrogate sensor data. For example, MAF sensor 42 may provide an output responsive to engine speed. At 88 the accelerator-accelerator-pedal position of the vehicle is sensed in electronic control system 36, via accelerator pedal-position sensor 46, for example.

At 90 it is determined whether the sensed speed is below a threshold. If the sensed speed is below the threshold, then the method advances to 92, where it is determined whether the accelerator-pedal position is above a threshold—i.e., depressed by more than a threshold amount. Accordingly, tip-in may be signaled, in the illustrated method, by an increase in accelerator-pedal position when the speed of one or both of the engine and the vehicle are below a threshold. In one scenario, the tip-in may be a tip-in from idle, while in other scenarios, the tip-in may be from an operating state having appreciable, but relatively low, engine speed and load. Continuing in method 84, if the speed is not below the threshold, or the accelerator-pedal position is not above the threshold, then the method returns.

At 94 the amount of spark advance applied in the cylinder is reduced. This action may comprise reducing one or both of the first and second amounts (vide supra) by which the spark is advanced relative to TDC of the compression stroke. In some embodiments, the amount by which the spark advance is reduced may depend on engine-operating conditions. For example, the amount by which the spark advance is reduced may be relatively small at high barometric pressure and larger at low barometric pressure. In one particular embodiment, this amount may be a function of the barometric pressure, increasing monotonically with decreasing barometric pressure. For some conditions, the amount of the reduction may be on the order of 30 crank-angle degrees. Reducing the spark advance causes the engine to emit a hotter exhaust, which supplies more kinetic energy to turbine 14.

At 96 the air-to-fuel ratio of the intake charge delivered to the cylinder is enriched. In one embodiment, this action may comprise increasing the amount of fuel injected into the cylinder. In another embodiment, it may comprise reducing the opening duration of the intake valve coupled to the cylinder—via valve timing adjustment, for example. In some embodiments, the level of the enrichment may depend on engine-operating conditions. For example, the enrichment level may be relatively small at high barometric pressure and larger at low barometric pressure. In one particular embodiment, this level may be a function of the barometric pressure, increasing monotonically with decreasing barometric pressure. For some conditions, the amount of the enrichment may be on the order of 15%. Enriching the air-to-fuel ratio may also cause the engine to emit a hotter exhaust, supplying more kinetic energy to turbine 14.

At substantially the same time that a first cylinder of the engine is run rich, a different cylinder of the engine may be run lean. Conditions may be adjusted such that the net effect of running one cylinder rich and another cylinder lean is to increase the exhaust temperature, for greater turbocharger torque, while keeping the air-to-fuel ratio of the exhaust at the normal level. This strategy protects the exhaust-aftertreatment catalysts from undesired periods of rich operation. In one embodiment, the lean- and rich-operating cylinders may be disposed on opposite cylinder banks of the engine.

At 98 the engine speed is sensed in the manner indicated above. At 100 it is determined whether the engine speed is above a threshold. If the engine speed is above the threshold, then the method advances to 102. However, if the engine speed is not above the threshold, then the method returns to 98, where the engine speed is sensed again. At 102 the spark advance is restored to its steady-state value. This action may comprise, in one embodiment, restoring the one or both of the first and second amounts to their steady-state values when the engine speed exceeds the threshold.

At 104 the vehicle speed is sensed in the manner indicated above. At 106 it is determined whether the vehicle speed is above a threshold. If the vehicle speed is above the threshold, then the method advances to 108, where the air-to-fuel ratio of the intake charge delivered to the cylinder is restored to its steady-state value, and the method returns. However, if the vehicle speed is not above the threshold, then the method returns to 104, where the vehicle speed is sensed again. The transition back to the normal spark advance and the normal air-to-fuel ratio, as well as the closing of the compressor by-pass valve, may be accomplished in such a way as to provide an optimal torque increase, consistent with driver demand, in the shortest possible time. In this and other embodiments, such transitioning may be enacted to optimize fuel economy, reduce emissions, and/or avoid a turbine over-temperature condition. In addition to enacting the algorithm described herein, the electronic control system may be configured to monitor engine mass air flow and compare it to a calibratable threshold to further refine the timing of the restoration in a manner that is robust to variations in road grade and vehicle cargo load.

Figure 9:
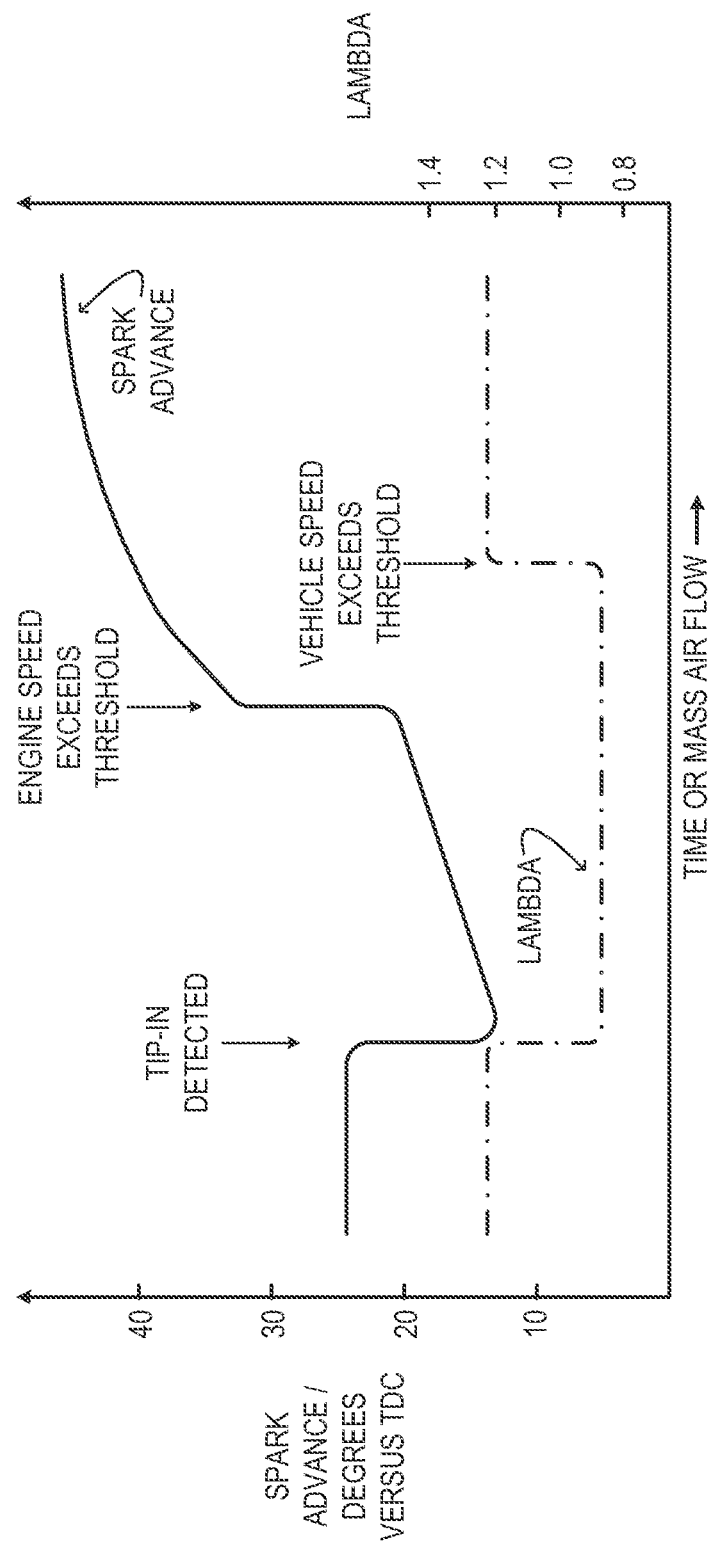
FIGS. 9 and 10 are graphs showing spark advance and air-to-fuel ratio plotted against time for an engine system in accordance with an embodiment of this disclosure.
Figure 10:
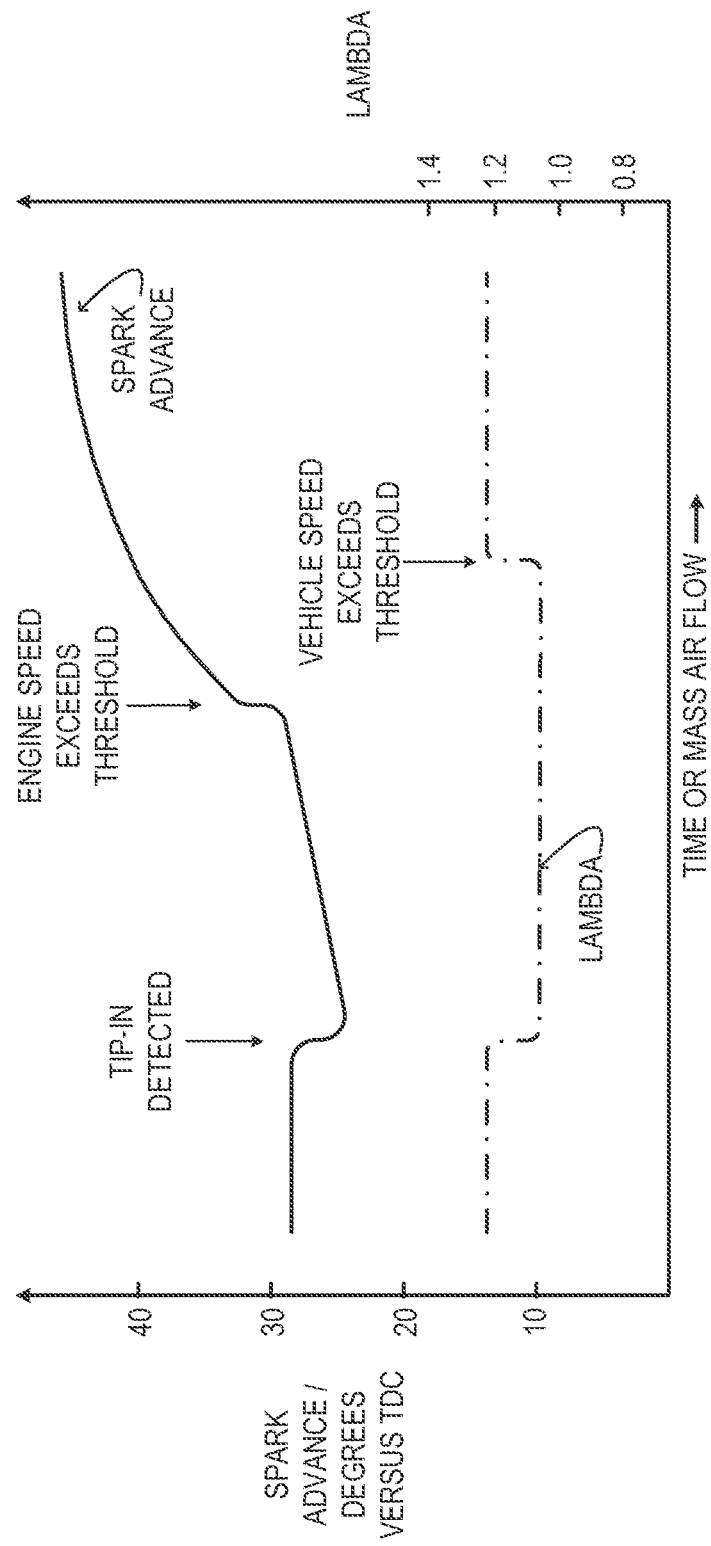

FIGS. 9 and 10 show additional aspects of the application of method 84 in one embodiment. These graphs simultaneously plot the amount of spark advance (solid line) and the air-to-fuel ratio (lambda, dot-dashed line) versus a suitable progress parameter—time, number of engine revolutions, integrated mass air flow, for instance. Detection of tip-in, at 92 of the method, results in concurrent reductions in the amount of spark advance and in the air-to-fuel ratio. When the engine speed exceeds a threshold value, at 100 of the method, the spark advance is restored to its steady-state value. When the vehicle speed exceeds a threshold value, at 106 of the method, the air-to-fuel ratio is restored to its steady-state value. FIGS. 9 and 10 differ in that the graph of FIG. 9 corresponds to low a relatively barometric pressure, and the graph of FIG. 10 corresponds to a relatively high barometric pressure. In FIG. 9, accordingly, the amount by which the spark advance is retarded during tip-in, and the level of enrichment of the air-to-fuel ratio during tip-in, are greater than in FIG. 10.

Taken together, FIGS. 9 and 10 show aspects of concurrent application of methods 70 and 84, in one embodiment. In particular, the level of spark advance prior to tip-in is lower in FIG. 9, which corresponds to relatively low barometric pressure, than in FIG. 10, which corresponds to relatively high barometric pressure.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A method of operating a vehicle's turbocharged engine having cylinders comprising:
    determining barometric pressures for a given engine speed and load;
        the barometric pressures comprising a first barometric pressure and a second barometric pressure being lower than the first barometric pressure;
    advancing an ignition spark by a first amount relative to top dead center in one of the cylinders, which undergoes the compression stroke for the given engine speed and load at the first barometric pressure; and
    advancing an ignition spark by a second amount relative to top dead center in the one of the cylinders, which undergoes the compression stroke for the given engine speed and load at the second barometric pressure;
        the second amount being less than the first amount relative to top dead center in the one of the cylinders, which undergoes the compression stroke for the given engine speed and load.

2. The method of claim 1 further comprising:
    at the first barometric pressure, adjusting engine speed at a first idle speed; and
    at the second barometric pressure, adjusting engine speed at a second idle speed;
        wherein the second idle speed at the second barometric pressure is higher than the first idle speed at the first barometric pressure.

3. The method of claim 1 further comprising:
    at the first barometric pressure for the given engine load, adjusting/opening an exhaust valve at a first timing; and
    at the second barometric pressure for the given engine load, adjusting/opening the exhaust valve at a second timing;

wherein the adjusting/opening the exhaust valve at the second timing at the second barometric pressure for the given engine load is earlier than the adjusting/opening the exhaust valve at the first timing at the first barometric pressure for the given engine load.

4. The method of claim 1 further comprising:
at the first barometric pressure for the given engine load, regulating an intake throttle to have a first amount of air; and
at the second barometric pressure for the given engine load, regulating the intake throttle to have a second amount of air;
wherein the second amount of air at the second barometric pressure for the given engine load is greater than the first amount of air at the first barometric pressure for the given engine load.

5. The method of claim 1 further comprising:
at the first barometric pressure for the given engine load, opening a compressor by-pass valve to discharge a first amount of air; and
at the second barometric pressure for the given engine load, opening the compressor by-pass valve to discharge a second amount of air;
wherein the second amount of air at the second barometric pressure for the given engine load is greater than the first amount of air at the first barometric pressure for the given engine load.

6. The method of claim 1 further comprising reducing of the first amount relative the one of the cylinders, which undergoes the compression stroke by which the ignition spark is advanced during tip-in.

7. The method of claim 6 further comprising enriching an air-to-fuel ratio of an intake charge of the cylinder during tip-in.

8. The method of claim 7 further comprising eliminating the air-to-fuel ratio enrichment to a steady state value when the speed of the vehicle exceeds a threshold.

9. The method of claim 7, wherein the one of the cylinders, which undergoes the compression stroke is a first cylinder of the engine, the method further comprising:
impoverishing an air-to-fuel ratio of an intake air charge of a second of the cylinders of the engine during tip-in.

10. The method of claim 6 wherein tip-in is signaled by an increase in accelerator-pedal position when a speed of one or both of the engine and the vehicle are below a threshold.

11. The method of claim 6 further comprising restoring the one or both of the first and second amounts to their steady-state values when the speed of the engine exceeds a threshold.

12. A method of operating a vehicle's turbocharged engine comprising:
determining barometric pressures for a given engine speed and load;
the barometric pressures comprising a first barometric pressure and a second barometric pressure being lower than the first barometric pressure;
advancing an ignition spark by a first amount relative to top dead center in one of a plurality of cylinders, which undergoes the compression stroke for the given engine speed and load at the first barometric pressure; and
advancing an ignition spark by a second amount relative to top dead center in the one of the plurality of said cylinders, which undergoes the compression stroke for the given engine speed and load at the second barometric pressure;
the second amount being less than the first amount relative to top dead center in the one of the plurality of said cylinders, which undergoes the compression stroke for the given engine speed and load,
reducing the first amount of ignition spark advance during a first tip-in at the first barometric pressure, and
reducing the second amount of ignition spark advance during a second tip-in at the second barometric pressure.

13. The method of claim 12 further comprising enriching an air-to-fuel ratio of an intake charge of the one of the plurality of said cylinders, which undergoes the compression stroke for the given engine speed and load during tip-in.

14. The method of claim 13 further comprising eliminating the enriching of the air-to-fuel ratio when a speed of the vehicle exceeds a threshold.

15. The method of claim 12 wherein the tip-in is a tip-in from idle.

16. The method of claim 12 further comprising eliminating one or both of the first and second amounts of advancement to steady state values when a speed of the engine exceeds a threshold.

17. A method of operating a turbocharged engine of a motor vehicle, the engine having cylinders comprising:
interrogating a motor vehicle operation in responsive to barometric pressures at different altitudes;
the barometric pressures comprising a first barometric pressure and a second barometric pressure being lower than the first barometric pressure;
advancing an ignition spark by a first amount relative to top dead center in one of the cylinders, which undergoes the compression stroke for the given engine speed and load at the first barometric pressure while operating the engine at a first idle speed; and
advancing an ignition spark by a second amount relative to top dead center in the one of the cylinders, which undergoes the compression stroke for the given engine speed and load at the second barometric pressure while operating the engine at a second idle speed;
the second amount being less than the first amount relative to top dead center in the one of the cylinders, which undergoes the compression stroke for the given engine speed and load; and
wherein the second idle speed is higher than the first idle speed of the engine for the given engine speed and load.

18. The method of claim 17 further comprising:
at a first barometric pressure for the given engine speed and load, opening an exhaust valve at a first timing;
at the second barometric pressure for the given engine speed and load, opening the exhaust valve at a second timing;
wherein the opening the exhaust valve at the second timing at the second barometric pressure for the given engine speed and load is earlier than the opening the exhaust valve at the first timing at the first barometric pressure for the given engine speed and load.

19. The method of claim 17 further comprising:
at a first barometric pressure for the given engine speed and load, regulating an intake throttle to have a first amount of air; and
at the second barometric pressure for the given engine speed and load, regulating the intake throttle to have a second amount of air;
wherein the second amount of air at the second barometric pressure for the given engine speed and load is greater than the first amount of air at the first barometric pressure for the given engine speed and load.

20. The method of claim 17 further comprising:
at a first barometric pressure for the given engine speed and load, opening a compressor by-pass valve to discharge a first amount of air; and
at the second barometric pressure for the given engine speed and load, opening the compressor by-pass valve to discharge a second amount of air
wherein the second amount of air at the second barometric pressure for the given engine speed and load is greater than the first amount of air at the first barometric pressure for the given engine speed and load.

* * * * *